(12) United States Patent
Bhikkaji et al.

(10) Patent No.: US 7,971,256 B2
(45) Date of Patent: Jun. 28, 2011

(54) MECHANISM TO CORRELATE THE PRESENCE OF WORMS IN A NETWORK

(75) Inventors: Bhargav Bhikkaji, Chennai (IN); Balaji Venkat, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1027 days.

(21) Appl. No.: 11/254,592

(22) Filed: Oct. 20, 2005

(65) Prior Publication Data
US 2007/0094730 A1    Apr. 26, 2007

(51) Int. Cl.
  G06F 11/00    (2006.01)
  G06F 12/14    (2006.01)
  G06F 12/16    (2006.01)
  G08B 23/00    (2006.01)
(52) U.S. Cl. ........................................................ 726/24
(58) Field of Classification Search .................. None
  See application file for complete search history.

(56) References Cited

U.S. PATENT DOCUMENTS

| | | | |
|---|---|---|---|
| 6,279,113 B1* | 8/2001 | Vaidya | 726/23 |
| 7,457,965 B2* | 11/2008 | Tamura et al. | 713/182 |
| 7,469,418 B1* | 12/2008 | Wilkinson et al. | 726/22 |
| 7,472,418 B1* | 12/2008 | McCorkendale et al. | 726/24 |
| 2004/0093521 A1* | 5/2004 | Hamadeh et al. | 713/201 |
| 2005/0033989 A1 | 2/2005 | Poletto et al. | |
| 2005/0091533 A1* | 4/2005 | Omote et al. | 713/201 |

* cited by examiner

Primary Examiner — Nasser Moazzami
Assistant Examiner — Trong Nguyen
(74) Attorney, Agent, or Firm — Fish & Richardson P.C.

(57) ABSTRACT

A method and a system for preventing a network attack, the attack being caused by the presence of worms in the network, is provided. The method includes determining the number of packets being transmitted from each source in the network to a plurality of destinations, the packets being transmitted from a source with a set of characteristics. If the number of packets with the set of characteristics, being transmitted from a source, exceeds a predefined first threshold, then the signature of the packets is stored. Subsequently, if at least one of the pluralities of destinations of the packets identified with the source becomes a source of new packets, the new packets being transmitted to more than one destination; then the new packets are compared with the signature. If at least one new packet matches with the signature, then the worm is to be detected.

8 Claims, 5 Drawing Sheets

MECHANISM TO CORRELATE THE PRESENCE OF WORMS IN A NETWORK

BACKGROUND OF THE INVENTION

1. Field of Invention

Embodiments of the invention relate in general to detection and extenuation of network worms. More specifically, the embodiments of the invention relate to methods and systems for enabling the detection of a worm outbreak in a network.

2. Description of the Background Art

Worms spread in a network by the replication of one infected host onto neighboring hosts. The worms generate Internet Protocol (IP) addresses in a random manner and breed/spawn their worm code onto the hosts, which are active in that randomly generated space of IP addresses. The breeding of worms is exponential in nature. For example, in an 'n' second timeframe, the number of hosts that are infected equals '$n_0 (1+r)^n$', where 'r' equals the number of hosts infected by the initial host, and $n_0$ is a constant. In conventional techniques, the outbreak of a worm in a network can be detected by the use of Intrusion Detection Systems (IDS) or Intrusion Prevention Systems (IPS). Most current IDS detect known network attacks by comparing the traffic on the network with known attack signatures. However, due to non-availability of known signatures, discovering new worm attack outbreaks can be difficult. Normally, such signatures can only be obtained after detailed analysis and reverse engineering of the new worm. However, this process is time-consuming.

Another conventional technology, known as Anomaly Detection (AD) technology, involves modeling the normal behavior of targets such as hosts, networks, and servers over a period of time. AD systems generate the normal profile of the targets, known as the baseline. Any new behavior from these targets triggers an anomalous event. However, even when the host tries to use a new legitimate service for the first time, these events are susceptible to false positives/alarms.

DETAILED DESCRIPTION OF EMBODIMENTS OF THE INVENTION

The various embodiments of the invention provide a method, a system, and a computer-readable medium for preventing a worm attack in a network. The embodiments of the invention detect the presence of a worm in the network and trigger appropriate counter-action whenever the worm attack is unleashed. This is done by correlating the spread of Internet Protocol (IP) addresses in a worm's randomly generated IP address space, along with the worm's packet signature and, a role-reversal behavior. The role-reversal behavior implies that the role of a port changes from initially being a target to being a propagator of the worm attack. For example, the target initially functions as a 'client' and after acquiring the worms, the role of the target reverses to that of a propagator, and it may function as a 'host'. Hereinafter, the target has been referred to as client and the propagator has been referred to as host. Furthermore, the system is protocol-agnostic.

According to the various embodiments of the invention, once an initial host in the network is infected with a worm, the worm spawns its code on the hosts, which are active in the randomly generated space of IP addresses. The rate at which these worms spread can be exponential. When the initial host is infected, the worm spawns onto the 'r' hosts. Considering this constant 'r' at every stage of the spawning, it is possible to arrive at the following mathematical formulation of how many hosts can be infected in a given 'n' second timeframe: If, $n_0=r$, where $n_0$ is the initial number of infected hosts;

then, $n_1=n_0(1+r)$ and, $n_2=n_0(1+r)*(1+r)$ which gives us the relation that $n_n=n_0(1+r)^n=r(1+r)^n$ Therefore, in the given n second timeframe, $r(1+r)^n$ number of hosts can become infected with the worm.

Figure 1:
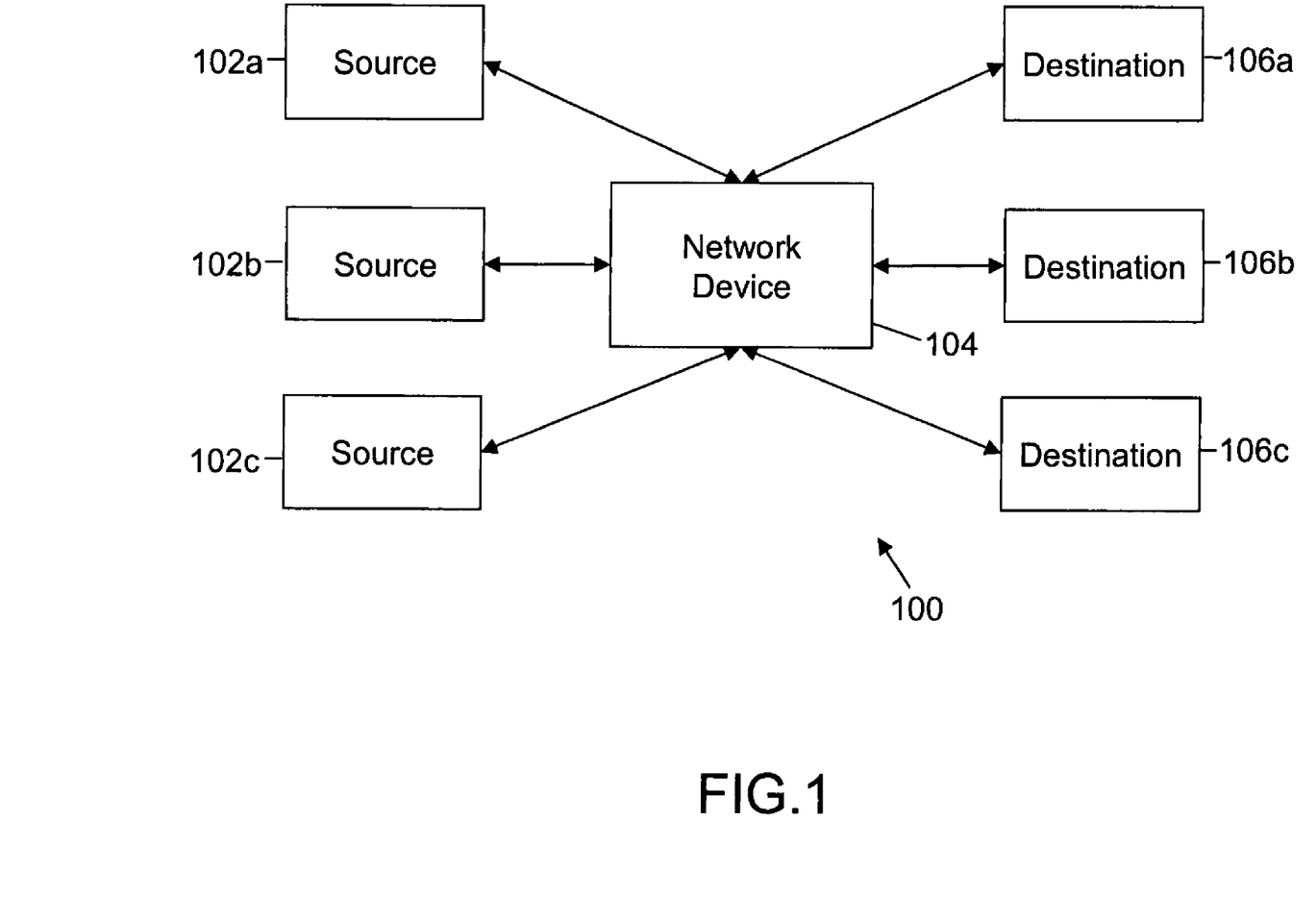
FIG. 1 illustrates an environment wherein an embodiment of the invention can be practiced.

FIG. 1 illustrates an environment wherein an embodiment of the invention can be practiced. Environment 100 includes a plurality of sources, a plurality of destinations, and a network device 104. Pluralities of sources include a source 102a, a source 102a, and a source 102c. Pluralities of destinations include a destination 106a, a destination 106b, and a destination 106c. According to the various embodiments of the invention, the pluralities of sources serve as a host to a worm, and the pluralities of destinations are the likely recipients of the worm. According to an exemplary embodiment of the invention, source 102a serves as a host to the worm, which spreads from source 102a to destination 106a through network device 104. Exemplary pluralities of sources and pluralities of destinations can be a data-processing unit. Examples of the data processing unit include a mainframe computer, a supercomputer, an enterprise application server, a workstation, an embedded system, and a personal computer. The personal computer can be a desktop computer, a laptop computer, a tablet computer, a Personal Digital Assistant (PDA), a Personal Video Recorder, a wearable computer, and so forth. Network device 104 can be a network interface between the pluralities of sources and the pluralities of destinations. Examples of the network include a wide Area Network (WAN) and a Local Area Network (LAN). Examples of the network, in terms of functionality, include a client-server network, a multitier architecture, and a peer-to-peer network. Examples of network device 104 include a bridge, a firewall, a gateway, a router, an ISDN terminal adapter, a hub, a switch, a multilayer switch, a line driver, a modem, a multiplexer, a network interface card, a protocol converter, a proxy, and so forth.

Figure 2:
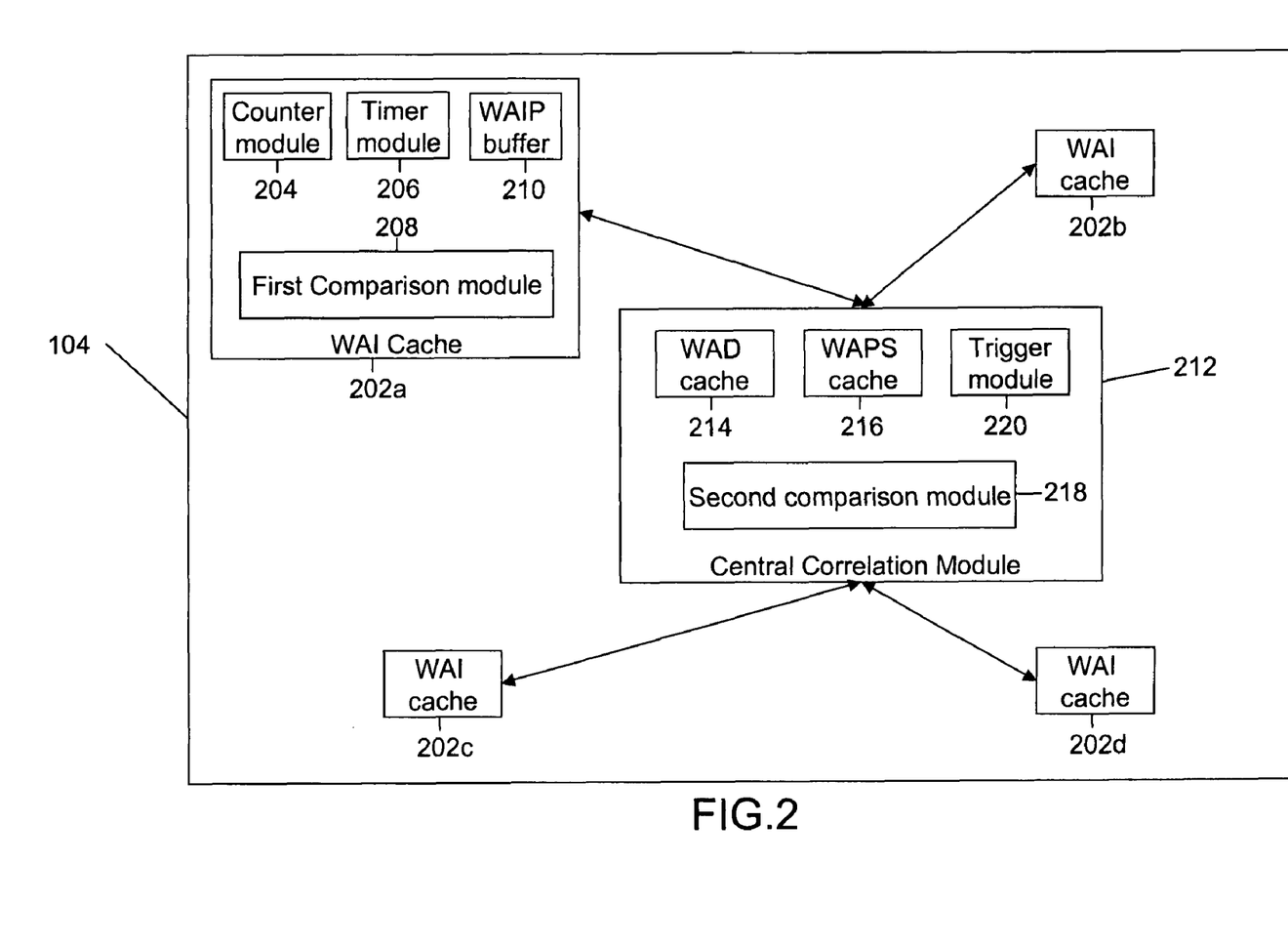
FIG. 2 illustrates a network device, in accordance with an exemplary embodiment of the present invention.

FIG. 2 illustrates a network device, in accordance with an exemplary embodiment of the present invention. Network device 104 includes a plurality of Worm Attack Identification (WAI) caches such as WAI cache 202a, WAI cache 202b, WAI cache 202c, WAI cache 202d, and a Central Correlation module (CCM) 212. According to the various embodiments of the invention, CCM 212 may be physically separate from WAI cache 202a, and may be located on a device that is not hosting WAI cache 202a. WAI cache 202a includes a counter module 204, a timer module 206, a first comparison module 208, and a Worm Attack Identification Packet (WAIP) buffer 210. WAI 202b, WAI 202c, and WAI 202d are identical to WAI 202a. WAI cache 202a stores packets with a set of characteristics. The set of characteristics include information about the communication protocol, the IP address of the source, the IP address of the destination, the port address of the source, and the port address of the destination of the packet.

Counter module 204 determines/counts the number of packets originating from a similar source IP address. A count is performed for the number of packets with similar protocols originating from a similar source IP address and source and/or destination port within a predefined timeframe. Timer module 206 determines a time during which the packets remain stored in WAI cache 202a.

First comparison module 208 compares the number of packets originating from a similar IP source address with a predefined first threshold (T1). First comparison module 208 also compares the number of packets originating from similar IP source address with a predefined second threshold (T2). According to the various embodiments of the invention, T2 is less than T1. These thresholds are so defined to reduce the latency during a correlation between the entries of WAD cache 214 and WAPS cache 216. Therefore, if T2 is less than T1, the WAPS cache 216 will be frequently updated with the worm signatures obtained from the connected WAI caches. Furthermore, CCM 212 will get faster and updated accesses to the various worm signatures from the WAPS cache 216, during the correlation.

WAI cache 202a is of a suitable size to contain numerous packet-length buffers. The length of the packet buffer is set to the highest Maximum Transmission Unit (MTU) of all its interfaces. This buffer is referred to as WAIP buffer 210. WAIP buffer 210 caches the packets originating from various sources.

In various embodiments of the invention, the network administrator defines the thresholds. WAI cache 202a transmits key information about the packets such as source IP address, destination IP address, source and destination port numbers, to a Worm Attack Detector (WAD) cache 214 if the number of packets originating from a similar IP source address exceeds T1. WAD cache 214 stores the key information about packets sent by the plurality of WAI caches. Furthermore, WAI cache 202a transmits at least the first packet in the exchange between the source IP address and an external host to a Worm Attack Packet Signature (WAPS) cache 216 if the number of packets originating from a similar IP source address exceeds the T2. According to various embodiments of the invention, WAI cache 202a can transmit a set of $(i)^{th}$ packets, where $i >= 1$, in the exchange between the source IP address and an external host, to WAPS cache 216. The packets that are transmitted and stored at WAPS cache 216 are referred to as the signatures of worm packets. The number of signatures that WAPS cache 216 stores is of manageable magnitude.

Similarly, the plurality of WAI cache transmits the key information about packets to WAD cache 214 and WAPS cache 216. An exemplary WAI cache can be a Content Addressable Memory for Popular Packet Persistence (CAM-PPP). An oft-repeated packet pattern persists in the CAM-PPP for a longer duration than in other packets. In various embodiments of the invention, the CAM-PPP is used for a faster search. For example, in a TCP/IP protocol, whenever an access switch on an end-host port receives a SYN packet, the CAM-PPP is populated with the first packet sent by the end host for that stream. Entries in CAM-PPP can either be 'populated' or 'free'. The entries can be typed as follows:

Each entry contains the following columns:
(1) The packet contents (length set appropriately to the highest Mass Transmission Unit of all interfaces)
(2) Age counter (normally set to the ticks since reboot)
This can be a 64-bit value that is incremented every clock tick in the CAM-PPP, or a highly granular clock tick.
(3) Encounter counter (number of times a packet coming in through a port from an end host has been encountered)
(4) Physical port on access switch where this packet was encountered.

Initially, all entries in the CAM-PPP are 'free'. When the first packet from the end host on a stream is seen, it is:
(a) Checked for the existence of CAM-PPP contents by carrying out a MATCH ( ) function
(b) If MATCH ( ) does not succeed and IS_FULL ( ) does not succeed,
  (i) the POPULATE ( ) function populates the packet in the CAM-PPP
  (ii) the age counter is initialized to an appropriate value
  (iii) the encounter counter is initialized to 1
  (iv) the physical port on which it was received is populated.
(c) If MATCH ( ) succeeds,
  (i) the encounter counter is incremented
(d) If MATCH ( ) does not succeed and IS_FULL is true (this means that there are no free entries in the CAM-PPP),
  (i) the entry with the least encounter counter and the largest age counter is displaced or freed by using the DISPLACE ( ) function
  (ii) the POPULATE ( ) function populates the packet in the CAM-PPP
  (iii) the age counter is initialized to an appropriate value
  (iv) the encounter counter is initialized to 1
  (v) the physical port on which it was received is populated.

This ensures that the CAM-PPP entries stay longer in the memory only if they are repeated consistently. Therefore, when the entries exceed T2, the actual packet signatures are exported to WAPS cache 216, in CCM 212. Upon exceeding T1, the export of the key information about packets to WAD cache 214 takes place. A CAM-PPP can be used to carry out the search, and hence is capable of tracking packets at the rate of many million packets per second. Hence, the tuning of the CAM-PPP device can be carried out for this functionality. Using this method, the worm would populate itself on all the CAM-PPP if it spreads throughout the network, thereby enabling an easy correlation.

According to the various embodiments of the invention, the size of CAM-PPP can be a function of how quickly the worm attack is to be detected. For example, the attack of flash-worms spreads very fast on the network, while that of lazy-worms is relatively slow. Therefore, the size of CAM-PPP can be increased or decreased for worm detection based on user-configured policies. For example, a flash worms detection policy can detect the presence of flash worms and for this purpose a relatively lesser portion of the CAM-PPP can be utilized for the detection of such worms. Furthermore, a lazy worms detection policy can detect the presence of lazy worms in the network, and for this purpose a larger portion of the CAM-PPP can be utilized for the detection of such worms.

According to the various embodiment of the invention, a time frame can be defined for deleting entries that have low encounter counter values in the CAM-PPP. For example, such entries can be called 'stale entries'. According to the various embodiments of the invention, all entries falling within a predefined lower bound time '$t_x$', and a predefined upper bound time '$t_y$' can be treated as stale entries. Subsequently, these entries can be deleted. Therefore, it would be possible to delete a random entry and, minimize the chances of a worm attack coinciding with the interval of time falling between $t_x$ and $t_y$.

According to the various embodiments of the invention, the CAM-PPP can be utilized for multiple purposes. For example, if a 1 Mega-Byte (MB) CAM is to be utilized for storing Access Control List (ACL) entries and for detecting worm signatures, then such co-utilization can be achieved by attaching a tag in the form of a 1-byte unique value, such as '0x1', along with each ACL entry. Similarly a 1-byte tag with different value, such as '0x2', can be attached with the worm signature entries. A search for an ACL entry, or worm signatures, can be performed on the basis of the unique value 0x1 and, 0x2 respectively. Therefore, the contents of the CAM-PPP may have different semantics based on the tag value, each value signifying a specific application search semantic.

CCM 212 correlates the packets that are transmitted from the plurality of WAI caches, with the signatures stored in WAPS cache 216. A second comparison module 218 compares the packet information stored in WAD cache 214 with the signatures stored in WAPS cache 216. Trigger module 220 triggers the detection of a worm in the network on the basis of the comparison performed by second comparison module 218. In an embodiment of the invention, trigger module generates an alert pertaining to the worm detection. According to the various embodiments of the invention, WAD cache 214, WAPS cache 216, second comparison module 218, and trigger module 220 can be placed within CCM 212. According to the various embodiments of the invention, CCM 212 can be tuned to determine if the role reversal is happening in a higher magnitude than is possible in a normal peer-to-peer application. This is necessitated in order to prevent any false-positives.

Figure 3:
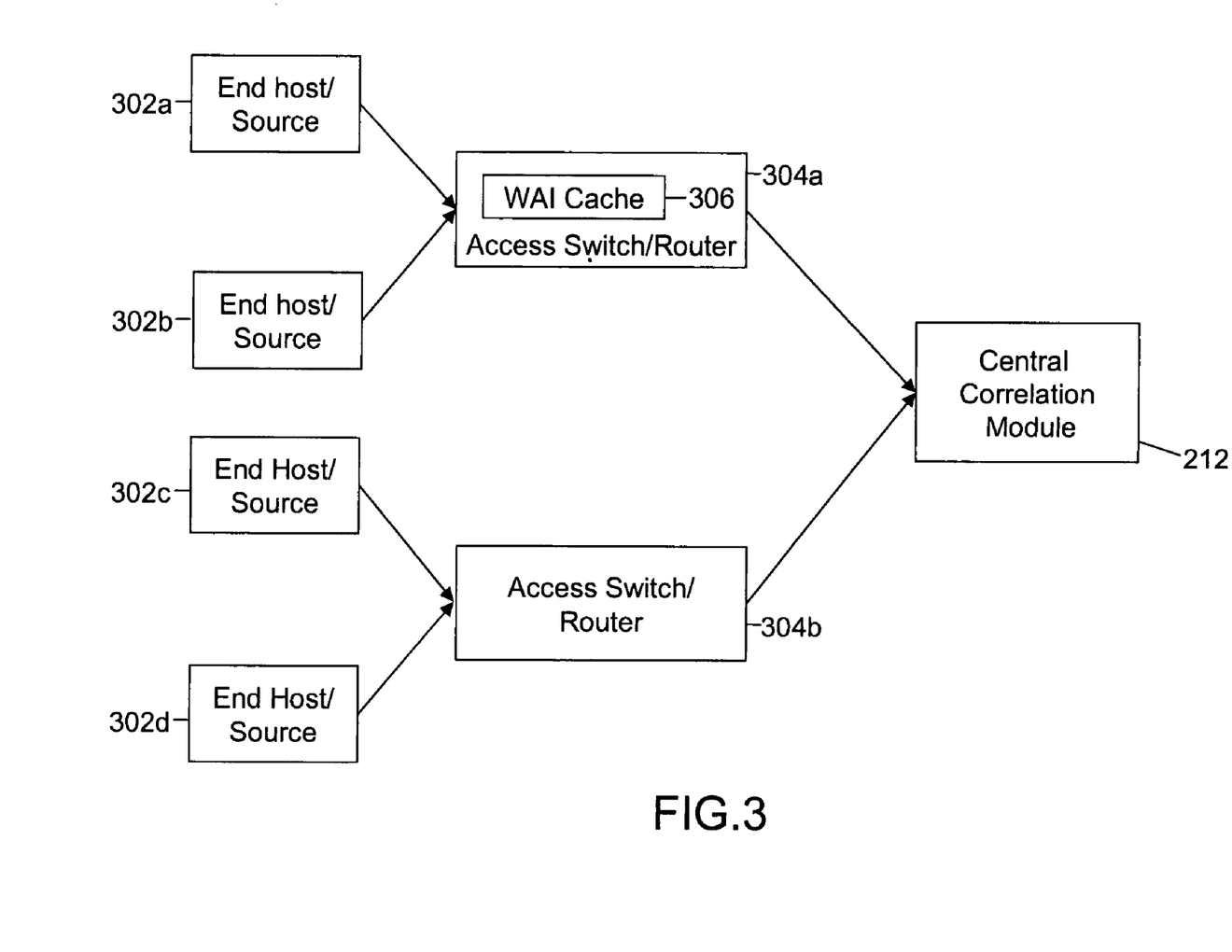
FIG. 3 illustrates an arrangement of network devices, in accordance with an exemplary embodiment of the present invention.

FIG. 3 illustrates an arrangement of network devices, in accordance with another exemplary embodiment of the present invention. The arrangement includes a plurality of end hosts/sources, a plurality of access switch/router, and Central Correlation Module (CCM) 212. The pluralities of the end host include an end host 302a, an end host 302b, an end host 302c, and an end host 302d. Each of the pluralities of end hosts are similar to source 102a. The pluralities of the access switch/router include an access switch 304a and an access switch 304b. Access switch 304a further includes a Worm Attack Identification (WAI) cache 306. WAI cache 306 is identical to the previously described WAI 202a cache. Access switch 304a is further connected to pluralities of end hosts, such as end host 302a, end host 302b, end host 302c, end host 302d, and so forth. Access switch 304b is identical to Access switch 304a. Furthermore, CCM 212 is also connected to pluralities of access switches, such as access switch 304a, access switch 304b, and so forth. Such an arrangement uses CCM 212 in a distributed fashion within the network. Therefore, each of the pluralities of WAI caches can be placed at each of the pluralities of access switches.

According to various embodiments of the invention, each access switch can also contain a CAM-PPP that is of a suitable size to contain a WAIP buffer, which forms part of the WAI cache. The WAIP buffers placed at the plurality of network access switches cache the packets originating from various sources. Based on T1 and T2, the cached packets can then be transmitted to CCM 212. Examples of CCM 212 include a centrally located enterprise/section-level Intrusion Detection System (IDS) device. WAD cache 214 and WAPS cache 216 can be placed in the enterprise level IDS device. Therefore, while the packets are cached at the access switches, the central section level IDS device can perform monitoring of WAD cache 214 and WAPS cache 216.

Figure 4:
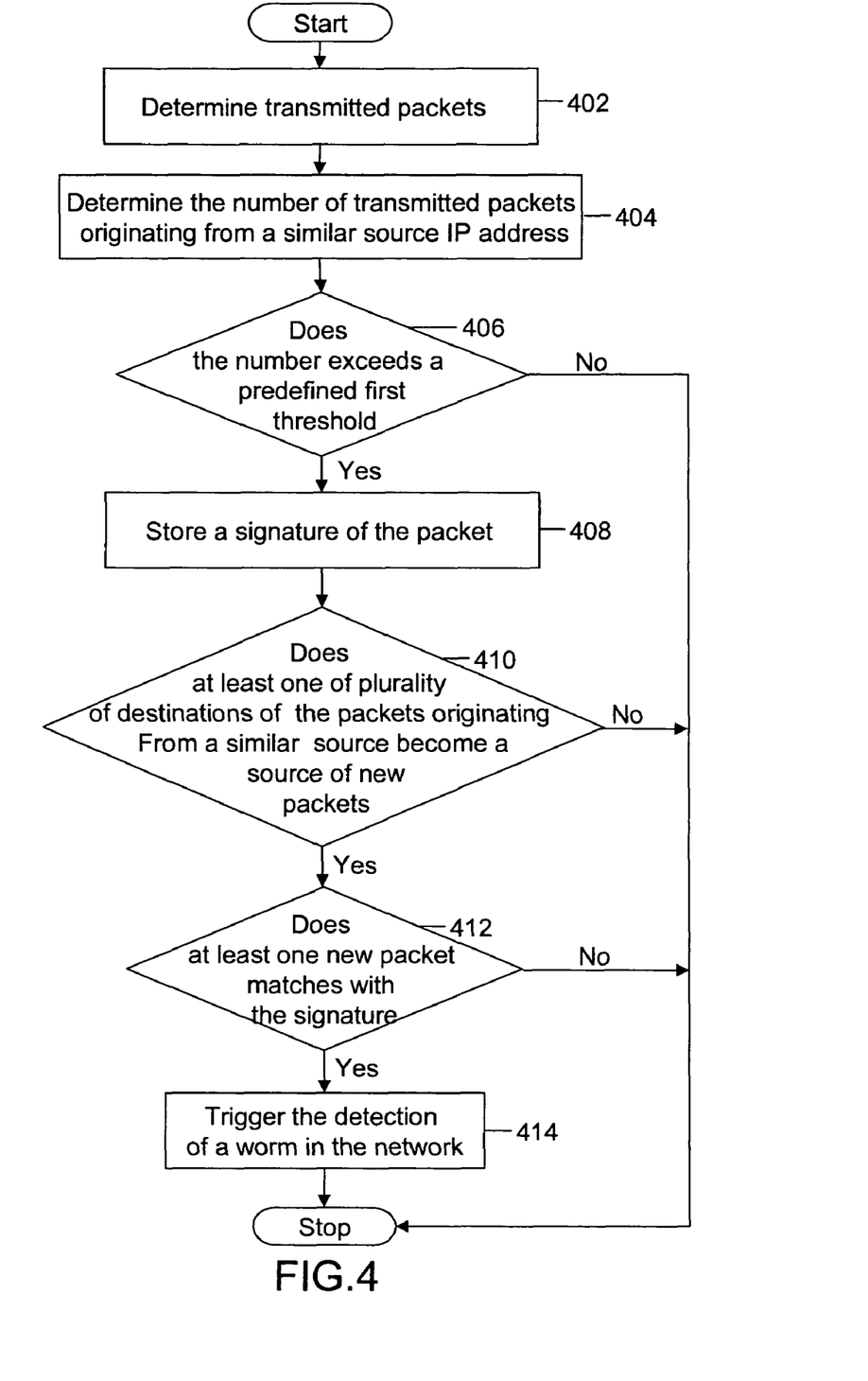
FIG. 4 is a flowchart depicting a method for preventing a worm attack in a network, in accordance with an exemplary embodiment of the present invention.

FIG. 4 illustrates a flowchart depicting a method for preventing a worm attack in a network, in accordance with an exemplary embodiment of the present invention. At step 402, counter module determines transmitted packets, which are transmitted from at least one of the plurality of sources to at least one of the plurality of destinations. Each of the transmitted packets comprises the set of characteristics. At step 404, counter module 204 determines/counts the number of data packets originating from a similar source IP address. At step 406, first comparison module 208 determines if the number of packets originating from the similar source IP address exceeds T1. If the number of packets originating from the similar source IP address exceeds T1, then step 408 is performed. At step 408, WAI cache 202a transmits at least the first packet in the exchange between the source IP address and an external host to Central Correlation module 212. These packets are considered as the signature of the worm. At step 410, WAD cache 214 checks if at least one of the pluralities of destinations of packets originating from a similar source becomes a source of new packets, i.e., whether the role of original destinations has been reversed. If the check performed at step 410 is true, then step 412 is performed. At step 412, second comparison module 218 compares the new packets originating from the previous destination devices with the signatures of the worms stored in the WAPS cache 216. A comparison is performed to determine if at least one new packet matches with the worm signatures. If at least one new packet matches with the worm signatures then step 414 is performed. At step 414, trigger module 220 triggers the detection of a worm in the network.

According to the various embodiments of the invention, the pluralities of WAI caches also include a drop module, which drops the detected worm traffic from the network.

Figure 5:
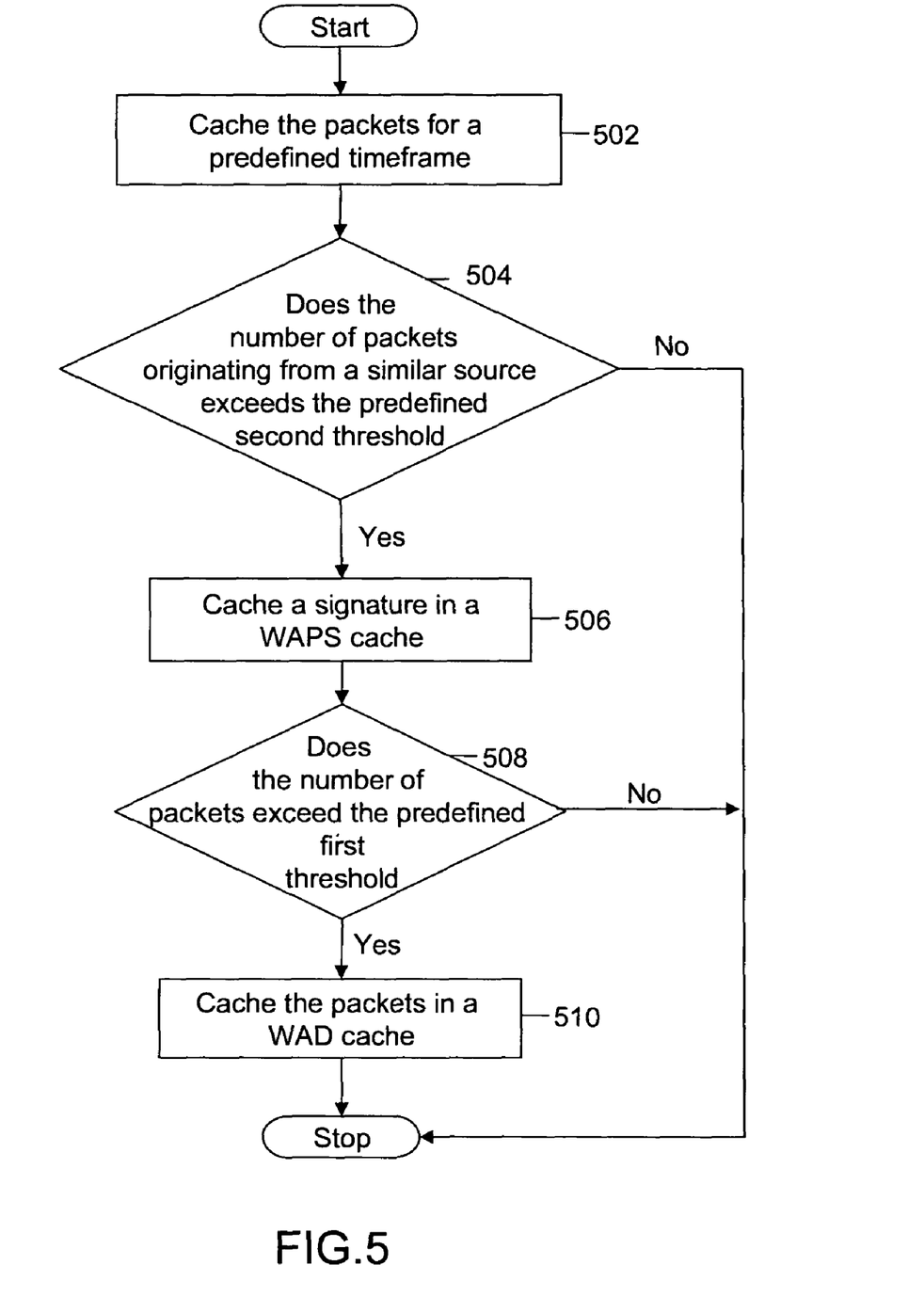
FIG. 5 is a flowchart depicting a method for storing the worm signatures of packets, in accordance with another exemplary embodiment of the invention.

FIG. 5 illustrates a flowchart depicting a method for storing the worm signatures of packets, in accordance with another exemplary embodiment of the invention.

At step 502, WAI cache 202a stores the packets for a predefined timeframe. At step 504, the first comparison module 208 checks if the number of packets originating from a similar source exceeds T2. If the number of packets originating from the similar source exceeds T2, then step 506 is performed. At step 506, these packets are stored in WAPS cache 216 as worm signature packets. At step 508, first comparison module 208 checks if the number of packets originating from a similar source exceeds T1. If the number of packets originating from the similar source exceeds T1, then step 510 is performed. At step 510, these packets are stored in WAD cache 214.

According to an exemplary embodiment of the invention, consider the communication of packets in the network by using the TCP/IP protocol. Whenever an SYN message is sent from the network to hosts outside the network, (considering that CCM 212 is set atop a router/switch that acts as a gateway), WAI cache 202a is populated with the following information: Src IP, Dest IP, Src Port, Dest Port, Protocol (TCP/IP), where 'Src IP' represents source IP address, 'Dest IP' represents destination IP address, 'Src Port' represents the source port, 'Dest Port' represents destination port, and 'Protocol' represents the communication protocol.

Timer module 206 assigns a timeframe for each of such entries. These entries expire within a reasonable timeframe defined by timer module 206. Since the worms spawn almost instantaneously, the reasonable period of time during which this entry has to be kept in WAI cache 202a can be a few seconds. Within this timeframe, entries originating from a similar source IP address, such as Src IP (X), are grouped together. Counter module 204 counts the number of entries with a similar Src IP (X). Now, first comparison module 208 compares the number of such entries with T1. If the number of such entries with a similar Src IP (X) exceeds T1, the entries with Src IP (X) are consolidated and grouped into WAD cache 214. Furthermore, first comparison module 208 compares the number of entries with a similar Src IP (X) with T2. If the number of such entries with a similar Src IP (X) exceeds T2, at least the first packet in the exchange between Src IP (X) and an external host is buffered in WAPS cache 216.

Central correlation module 212 performs periodic monitoring on WAD cache 214, using the following algorithm:

If there are entries in WAD cache 214 so that Src IP is (X) and Dst IP is (Y), and there is a population of entries in WAD cache 214 with Src IP (Y) with varying Dst IPs, with a destination port similar to the entries that were related to Src IP (X), then WAPS cache 216 entries for the sets of flows coming from Src IP (X) and Src IP (Y) are compared for signature matches. If these match, a worm attack is detected.

The periodic scan of WAD cache 214 and the grouping usually takes a period of about a few seconds. Once the entries are grouped and their number exceeds T2, the worm packet signature is stored; and when the entry migrates to WAD cache 214, the monitoring begins. Moreover, the next batch of infected hosts, their respective Src IPs, and their worm signature patterns are populated in WAD cache 214. According to various embodiments of the invention, it is also possible to arrive at 'r', the rate of infection signified by the number of hosts that a single worm would attempt to infect. This can be carried out by correlating the entries in WAD cache 214 with a specific Src IP (X).

According to the various embodiments of the invention, it is possible to tweak the amount of memory used to store the packets in the WAI, the WAD, and the WAPS caches. This is done in order to trigger the detection of a worm only after the spread is truly confirmed by the '$n^{th}$' iteration of the spread, where n can be a predefined number.

Various embodiments of the invention provide a method for detecting the outbreak of a worm such as flash worm, lazy worm and so forth, in a network. The embodiments of the invention describe a distributed solution for prevention of worms in a network instead of a single Intrusion Prevention System (IPS) system. Caching of packets is carried out by WAI caches at the access switch level, and based on the predefined thresholds; the packets are transferred to a central correlation module. The periodicity of this exercise is well within a period of n seconds or less. For example, the value of n can be five seconds. However, because the correlation module can be centrally placed, latency from the access switch to the central correlation module can be less than the worm-spread period of n seconds or less. Therefore, the counter action triggered can be well within a period of time, within which the worm spread can be isolated and fixed.

The embodiments of the invention use smaller WAI caches at the edges of the network (closest to the end source/host) and a much larger aggregation cache at the central correlation module, in order to detect the worm infection. Moreover, the amount of storage required on the WAI caches is much less than that in the central correlation module, which can have a larger memory and processing power. Furthermore, the WAI caches can be used for purposes other than worm detection, thus resulting in co-utilization of the caching resources.

Although the invention has been discussed with respect to specific embodiments thereof, these embodiments are merely illustrative, and not restrictive, of the invention. For example, a 'A method for preventing a network attack, the attack being due to the presence of worms in the network' can include any type of analysis, manual or automatic, to anticipate the needs preventing a network worm attack.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store, the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    determining, by a computer, transmitted packets from at least one of a plurality of sources to at least one of a plurality of destinations in a network, each of the transmitted packets comprising a set of characteristics;
    determining a number of the transmitted packets originating from a similar source internet protocol (IP) address;
    if the number of the transmitted packets exceeds a predefined first threshold, transmitting information about at least one packet of the transmitted packets from a worm attack identification (WAI) cache to a worm attack detector (WAD) cache, wherein the predefined first threshold is associated with a first number of packets originating from the similar source IP address, wherein the WAI cache is a content addressable memory, wherein the WAI cache has a size that is a function of how quickly a worm attack is to be detected, and wherein the size of the WAI cache is increased or decreased for worm detection based on at least one user-configured worm detection policy;
    if the number of the transmitted packets exceeds a predefined second threshold, transmitting at least one signature packet from the WAI cache to a worm attack packet signature (WAPS) cache, wherein the at least one signature packet corresponds to at least one packet of the transmitted packets, wherein the predefined second threshold is less than the predefined first threshold, and wherein the predefined second threshold is associated with a second number of packets originating from the similar source IP address;
    if at least one of the plurality of destinations becomes a source of new packets, comparing the new packets with stored signature packets in the WAPS cache, wherein the new packets are transmitted to at least one of the plurality of destinations; and
    if at least one of the new packets matches a stored signature packet, triggering a detection of a worm in the network.

2. The method of claim 1, wherein the set of characteristics includes a protocol.

3. The method of claim 1, wherein triggering the detection of the worm further comprises dropping worm traffic, the worm traffic corresponding to the worm.

4. The method of claim 1, wherein caching each of the transmitted packets in the WAI cache further comprises assigning a timer to the WAI cache, the timer deciding a time frame for a storage of the transmitted packets in the WAI cache.

5. The method of claim 1, wherein the caching each of the transmitted packets in the WAI cache further comprises caching the transmitted packets in a worm attack detection (WAD) cache, the caching being performed if the number of the transmitted packets is more than the predefined first threshold.

6. The method of claim 5, further comprising caching the signature packets in the WAPS cache including storing at least a first packet, the first packet being one of the transmitted packets that is exchanged between at least one of the plurality of sources and an external host.

7. A system comprising:
   means for determining transmitted packets from at least one of a plurality of sources to at least one of a plurality of destinations in a network, each of the transmitted packets comprising a set of characteristics;
   means for determining a number of the transmitted packets originating from a similar source internet protocol (IP) address;
   if the number of the transmitted packets exceeds a predefined first threshold, means for transmitting information about at least one packet of the transmitted packets from a worm attack identification (WAI) cache to a worm attack detector (WAD) cache, wherein the predefined first threshold is associated with a first number of packets originating from the similar source IP address, wherein the WAI cache is a content addressable memory, wherein the WAI cache has a size that is a function of how quickly a worm attack is to be detected, and wherein the size of the WAI cache is increased or decreased for worm detection based on at least one user-configured worm detection policy;
   if the number of the transmitted packets exceeds a predefined second threshold, means for transmitting at least one signature packet from the WAI cache to a worm attack packet signature (WAPS) cache, wherein the at least one signature packet corresponds to at least one packet of the transmitted packets, wherein the predefined second threshold is less than the predefined first threshold, and wherein the predefined second threshold is associated with a second number of packets originating from the similar source IP address;
   if at least one of the plurality of destinations becomes a source of new packets, means for comparing the new packets with stored signature packets in the WAPS cache, wherein the new packets are transmitted to at least one of the plurality of destinations; and
   if at least one of the new packets matches a stored signature packet, means for triggering a detection of a worm in the network.

8. An apparatus comprising:
   a processing system comprising a processor coupled to a display and a user input device;
   a machine-readable medium comprising instructions executable by the processor comprising:
      one or more instructions for determining transmitted packets from at least one of a plurality of sources to at least one of a plurality of destinations in a network, each of the transmitted packets comprising a set of characteristics;
      one or more instructions for determining a number of the transmitted packets originating from a similar source internet protocol (IP) address;
      if the number of the transmitted packets exceeds a predefined first threshold, one or more instructions for transmitting information about at least one packet of the transmitted packets from a worm attack identification (WAI) cache to a worm attack detector (WAD) cache, wherein the predefined first threshold is associated with a first number of packets originating from the similar source IP address, wherein the WAI cache is a content addressable memory, wherein the WAI cache has a size that is a function of how quickly a worm attack is to be detected, and wherein the size of the WAI cache is increased or decreased for worm detection based on at least one user-configured worm detection policy;
      if the number of the transmitted packets exceeds a predefined second threshold, one or more instructions for transmitting at least one signature packet from the WAI cache to a worm attack packet signature (WAPS) cache, wherein the at least one signature packet corresponds to at least one packet of the transmitted packets, wherein the predefined second threshold is less than the predefined first threshold, and wherein the predefined second threshold is associated with a second number of packets originating from the similar source IP address;
      if at least one of the plurality of destinations becomes a source of new packets, one or more instructions for comparing the new packets with stored signature packets in the WAPS cache, wherein the new packets are transmitted to at least one of the plurality of destinations; and
      if at least one of the new packets matches a stored signature packet, one or more instructions for triggering a detection of a worm in the network.

* * * * *